(12) United States Patent
Agosti et al.

(10) Patent No.: US 12,728,383 B2
(45) Date of Patent: Sep. 8, 2026

(54) ROTARY BED DEHUMIDIFICATION SYSTEM AND METHOD WITH CONTROL OF CONDENSATION IN RECIRCULATING LOOP

(71) Applicant: MUNTERS CORPORATION, Amesbury, MA (US)

(72) Inventors: Michael A. Agosti, North Andover, MA (US); Francis John LaRosa, II, Chelsea, MA (US)

(73) Assignee: Munters Corporation, Amesbury, MA (US)

( * ) Notice: Subject to any disclaimer, the term of this patent is extended or adjusted under 35 U.S.C. 154(b) by 666 days.

(21) Appl. No.: 18/079,626

(22) Filed: Dec. 12, 2022

(65) Prior Publication Data

US 2023/0182067 A1 Jun. 15, 2023

Related U.S. Application Data

(60) Provisional application No. 63/288,910, filed on Dec. 13, 2021.

(51) Int. Cl.
*B01D 53/02* (2006.01)
*B01D 53/06* (2006.01)
*B01D 53/26* (2006.01)

(52) U.S. Cl.
CPC ........... *B01D 53/06* (2013.01); *B01D 53/261* (2013.01); *B01D 2259/4009* (2013.01)

(58) Field of Classification Search
CPC .... B01D 2257/708; B01D 2259/40009; B01D 2259/40054; B01D 2259/4009; B01D 53/0454; B01D 53/0462; B01D 53/06; B01D 53/261
See application file for complete search history.

(56) References Cited

U.S. PATENT DOCUMENTS 4,701,189 A 10/1987 Oliker
7,101,414 B2 9/2006 Dinnage et al.
2005/0235827 A1 10/2005 Dinnage et al.
(Continued)

OTHER PUBLICATIONS

Office Action dated Sep. 1, 2022, in Swedish Patent Application No. 2250063-1 (9 pages).

(Continued)

*Primary Examiner* — Christopher P Jones
(74) *Attorney, Agent, or Firm* — Venable LLP

(57) ABSTRACT

A rotary sorption bed system includes a rotating sorbent mass of a regenerable sorbent material, in which in a cycle of operation, a given volume of the sorbent mass sequentially passes through first, second, third, and fourth zones, before returning to the first zone. A process fluid stream is directed through the first zone, a regeneration fluid stream is directed through the third zone, and a recycled fluid stream recirculates in a closed loop independent of the process fluid stream and the regeneration fluid stream through the second and fourth zones. At least one parameter of the recycled fluid stream, including at least one of the dry bulb temperature and the dew point of the recycled fluid stream, is monitored and the recycled fluid stream is controlled based on the at least one parameter. The recycled fluid stream can be any one or more of purge, isolation, and purge/regeneration loops.

14 Claims, 7 Drawing Sheets

(56) References Cited

U.S. PATENT DOCUMENTS

| | | | | |
|---|---|---|---|---|
| 2010/0205821 | A1* | 8/2010 | Tada | F26B 21/083 34/570 |
| 2010/0275775 | A1 | 11/2010 | Griffiths et al. | |
| 2015/0153051 | A1 | 6/2015 | Pahwa et al. | |
| 2020/0001226 | A1 | 1/2020 | Brickley et al. | |

OTHER PUBLICATIONS

International Search Report dated Mar. 17, 2023, in International Patent Application No. PCT/US2022/052564.

* cited by examiner

Munters HCE-15000 with PowerPurge™ no FBP

| HR | | Temp | Enthalpy | Dehumidifier Steam React Heater | | | | Process Outlet conditions | | DP | Purge T | Regen | Power | React T. | | | |
|---|---|---|---|---|---|---|---|---|---|---|---|---|---|---|---|---|---|
| Mid-points | Frequency | MC | MC | Heated-to | Airflow | Gas Energy | Therms/Year | Temp | Moisture | | | | | | Purge Vflow | RPH | |
| (gr/lb) | (hrs/yr) | (F) | h (BTU/lb) | Temp (F) | (SCFM) | (BTU/HR) | | (F) | (F) | (F) | (F) | % | (kW) | (F) | (SCFM) | | |
| 135 | 6 | 84.4 | 41.1 | 299 | 3820 | 1,288,203 | 78 | 99.7 | 2.5 | 55 | 54.7 | 19.0 | 266.0 | 120.0 | 600.0 | 10.2 | x |
| 125 | 97 | 82.5 | 39.2 | 297 | 4020 | 1,330,297 | 1,290 | 99.8 | 2.5 | 55 | 54.6 | 20.5 | 273.0 | 120.0 | 600.0 | 10.2 | x |
| 115 | 268 | 78.7 | 36.9 | 297 | 4040 | 1,360,458 | 3,619 | 99.9 | 2.5 | 54 | 54.4 | 21.1 | 279.0 | 120.0 | 600.0 | 10.2 | x |
| 105 | 275 | 76.6 | 34.8 | 296 | 4100 | 1,388,001 | 3,817 | 100.0 | 2.5 | 54 | [illegible] | 22.5 | 285.0 | 120.0 | 600.0 | 10.2 | x |
| 95 | 298 | 73.6 | 32.4 | 295 | 4180 | 1,427,769 | 4,226 | 100.0 | 2.5 | 53 | [illegible] | 25.0 | 293.0 | 120.0 | 600.0 | 10.2 | x |
| 85 | 355 | 71.3 | 30.3 | 294 | 4250 | 1,460,013 | 5,183 | 101.0 | 2.5 | 53 | [illegible] | 27.0 | 300.0 | 120.0 | 600.0 | 10.2 | x |
| 75 | 444 | 67.8 | 27.9 | 293 | 4300 | 1,493,769 | 6,632 | 101.0 | 2.5 | 53 | [illegible] | 29.0 | 307.0 | 120.0 | 600.0 | 10.2 | x |
| 65 | 673 | 64.1 | 25.5 | 291 | 4370 | 1,529,569 | 10,294 | 101.0 | 2.5 | 52 | [illegible] | 31.3 | 314.0 | 120.0 | 600.0 | 10.2 | x |
| 55 | 682 | 63.4 | 23.7 | 291 | 4360 | 1,531,087 | 10,442 | 101.0 | 2.5 | 51 | 51.5 | 33.3 | 317.0 | 120.0 | 600.0 | 10.2 | x |
| 45 | 794 | 57.5 | 20.8 | 298 | 3640 | 1,350,390 | 10,722 | 94.2 | 2.5 | 44 | 50.9 | 30.6 | 277.0 | 120.0 | 600.0 | 10.2 | x |
| 35 | 1021 | 51.5 | 17.7 | 308 | 2900 | 1,147,453 | 11,715 | 87.1 | 2.5 | 37 | 49.8 | 24.2 | 235.0 | 120.0 | 600.0 | 10.2 | x |
| 25 | 1140 | 43.1 | 14.2 | 316 | 2320 | 976,962 | 11,137 | 72.8 | 2.5 | 25 | 42.3 | 32.7 | 200.0 | 120.0 | 600.0 | 10.2 | x |
| 15 | 1739 | 34.3 | 10.5 | 325 | 1765 | 791,683 | 13,767 | 58.1 | 2.5 | 8 | 38.8 | 1.6 | 152.4 | 120.0 | 600.0 | 10.2 | x |
| 5 | 972 | 23.8 | 6.8 | | | - | - | | | | | | | | | | |

FIG. 6

ROTARY BED DEHUMIDIFICATION SYSTEM AND METHOD WITH CONTROL OF CONDENSATION IN RECIRCULATING LOOP

This application claims the benefit of U.S. Provisional Patent Application No. 63/288,910, filed Dec. 13, 2021, the disclosure of which is incorporated herein by reference.

This application further incorporates herein by reference the disclosure in U.S. Pat. No. 7,101,414 and U.S. Patent Application Publication No. 2020/0001226.

BACKGROUND OF THE INVENTION

Field of the Invention

The present invention relates generally to a rotary bed sorption system, and, in particular, to a rotary bed sorption system that includes one or more of purge, isolation, and purge/regeneration loops. The invention also relates to methods of designing and operating such a system.

Description of the Related Art

Rotary bed sorption systems have long been used to collect a sorbate from one fluid stream, sometimes called a process or sorption fluid stream, and transfer it, in a more concentrated form, to a second fluid stream, sometimes called a desorption or regeneration fluid stream. Commonly-removed sorbates include water vapor, volatile organic compounds ("VOCs"), nitrous oxides ("NOx"), and the like.

It is known to incorporate purge zones in rotary bed sorption systems. An example of a sorption bed system including a recirculating purge loop is disclosed in U.S. Pat. No. 4,701,189. It is also known to use one or more isolation fluid streams or loops in order to reduce cross-contamination between sorption and desorption zones of rotary sorption beds. U.S. Pat. No. 7,101,414 describes several embodiments in which one or more isolation loops are used to achieve different goals. U.S. Patent Application Publication No. 2020/001226 uses an isolation fluid stream that recirculates in a closed loop independent of the process fluid stream and the regeneration fluid stream and the regeneration fluid stream passes through a fifth zone before passing through the regeneration zone, that is, a purge/regeneration loop.

In many rotary bed sorption systems, current designs utilize a fixed speed fan based on one or two sets of operational conditions, typically peak, worst case conditions. At off-peak or low-volume airflow conditions, condensation is possible in the recycled air loop, which poses maintenance problems and limits what type of desiccant wheel can be used.

SUMMARY OF THE INVENTION

The present invention uses a recycled purge loop that cools the rotor material on the process air inlet side and pre-warms the rotor before it enters the regeneration sector. Condensation in the recirculating loops, such as the purge loop, can be prevented.

According to one aspect of the present invention, a method of reducing the sorbate concentration of a process fluid stream using a sorption bed system comprising a rotating mass of a regenerable sorbent material includes the steps of rotating the sorbent mass so that, in a cycle of operation, a given volume of the sorbent mass sequentially passes through at least first, second, third, and fourth zones, before returning to the first zone, passing a process fluid stream through the sorbent mass in the first zone, passing a regeneration fluid stream through the sorbent mass in the third zone, recycling a recycled fluid stream in a closed loop, independent of the process fluid stream and the regeneration fluid stream, between the sorbent mass in the fourth zone and in the second zone, monitoring at least one parameter in the recycled fluid stream, and controlling the recycled fluid stream based on the at least one parameter.

According to another aspect of the present invention, a rotary sorption bed system includes a rotating sorbent mass of a regenerable sorbent material, in a cycle of operation, a given volume of the sorbent mass sequentially passing through at least first, second, third, and fourth zones, before returning to the first zone, a process fluid stream directed through the first zone, a regeneration fluid stream directed through the third zone, a recycled fluid stream that recirculates in a closed loop independent of the process fluid stream and the regeneration fluid stream through the second and fourth zones, a sensor configured to measure at least one parameter in the recycled fluid stream, and a controller configured to control the recycled fluid stream based on the measured at least one parameter.

As used herein, "cycle of operation" means a path of movement of the sorbent mass during which the sorbent mass undergoes both a sorption and desorption process. The term "sequentially" refers to a relative order, but does not necessarily require that one immediately follow another. In this embodiment, for example, even if another zone were interposed between the first zone and the second zone, it would still be accurate to say that the sorbent mass sequentially passes through the first zone, the second zone, and so on.

A better understanding of these and other aspects of the present invention may be had by reference to the drawings and to the accompanying description, in which preferred embodiments of the invention are illustrated and described.

BRIEF DESCRIPTION OF THE DRAWINGS

FIG. 6 is a chart showing performance analysis of a rotary bed sorption system at a set purge volume.

DESCRIPTION OF THE PREFERRED EMBODIMENTS

Figure 1:
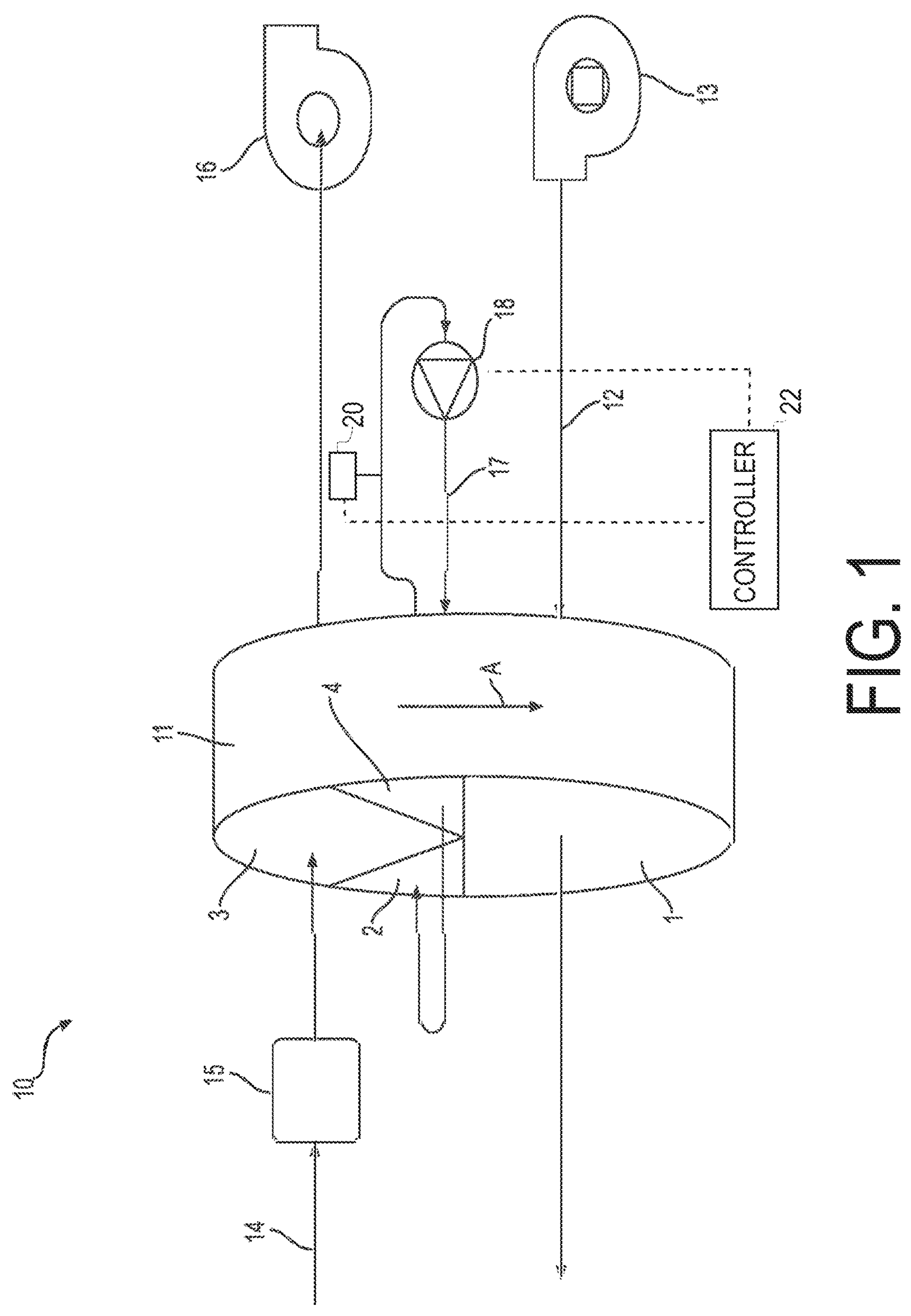
FIG. 1 is a schematic flow diagram illustrating a preferred embodiment of a rotary bed sorption system in accordance with the invention.
Figure 2:
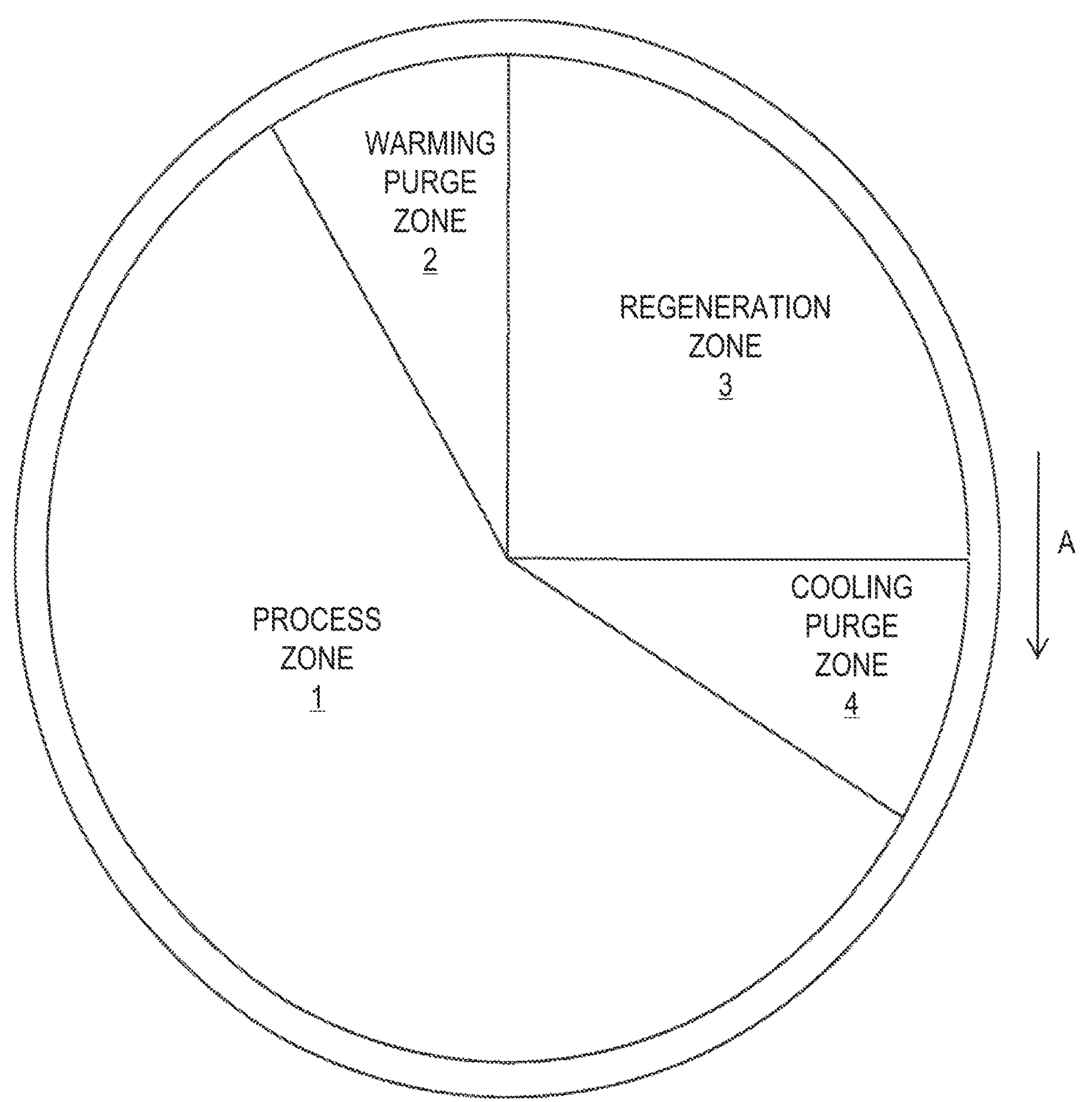
FIG. 2 is a schematic view of the sectors of a sorbent mass in the preferred embodiment of the rotary bed sorption system in accordance with the invention.

FIG. 1 illustrates a preferred embodiment of a rotary bed sorption system 10 in accordance with the present invention. The system includes a rotating disk-shaped porous mass or rotor 11 of a conventional construction containing or coated with regenerable sorbent material that, in a cycle of operation, sequentially passes through four zones, namely, a first zone 1, a second zone 2, a third zone 3, and a fourth zone 4. The sorbent rotor 11 is rotated about its axis in the direction indicated by arrow A by a known rotor mechanism (not shown). The four zones, in order in the direction of rotation of the rotor 11, can be identified as a process zone 1 through which process air flows, a first recycle zone 2 through which recycled or recirculated air flows, a regeneration zone 3 through which heated regeneration air flows, and a second recycle zone 4 through which the recycled air flows before the process zone. In this example, the recycled air is purge air and zone 2 is a first (warming) purge zone through which purge air flows to pre-warm the rotor, while zone 4 is a second (cooling) purge zone through which the purge air flows to cool the rotor before the process zone A process fluid stream 12 carrying a sorbate (e.g., water vapor) is passed through the sorbent rotor 11 in the first zone 1, where the sorbate is sorbed (i.e., loaded) onto the sorbent rotor 11. The process fluid stream exiting the sorbent mass has a reduced sorbate concentration compared to the process fluid stream entering the sorbent mass. A fan, blower, or other fluid-moving device 13 can be used to drive the process fluid flow through duct work (not shown). As an example, the sorbate is water vapor and the system 10 functions as a dehumidification system or dehumidifier.

A regeneration fluid stream 14 is passed through the sorbent rotor 11 in the third zone 3, in a direction opposite to the flow of the process fluid stream 12. The sorbent from the process fluid stream that was collected in the sorbent mass 11 (in this example, water vapor) is released into the regeneration fluid stream. A heater 15 can be provided to heat the regeneration fluid stream 14 prior to its passing through the sorbent mass 11. As with the process fluid stream, a fan, blower, or other fluid-moving device 16 can be used to drive the regeneration fluid flow.

Although the regeneration fluid stream 14 is not shown in FIG. 1 as being a closed loop circuit, those skilled in the art will appreciate that that fluid stream can be recirculated in a closed loop. For example, upon exiting the sorbent mass, the regeneration fluid stream can be cooled to condense vapor out of the fluid stream and then be reheated before being routed back through the sorbent mass.

In the shown embodiment, a purge fluid stream 17 is recycled in a closed loop, independent of the process fluid stream 12 and the regeneration fluid stream 14, between the sorbent mass 11 in the second zone 2 and in the fourth zone 4. Preferably, the direction that the purge fluid stream 17 flows through the sorbent mass 11 is the same direction as the fluid flowing through the zone immediately following the purge zone in the direction of rotation of the sorbent mass 11. In FIG. 1, for example, the purge fluid stream 17 passes through the second zone 2 in the same direction that regeneration fluid stream 14 flows through the third zone 3, and passes through the fourth zone 4 in the same direction that the process fluid stream 12 flows through the first zone 1. Alternatively, the direction that the purge fluid stream flows through the sorbent mass could be opposite from the direction of fluid flow through the zone immediately following the purge zone in the direction of rotation of the sorbent mass. A fan, blower, or other fluid-moving device 18 is provided to drive the purge fluid flow. Fan 18 is preferably of a variable speed type and can be controlled to vary the flow rate of fluid through the purge loop. Rather than a variable speed fan, other known means to modify fluid flow can be utilized, such as dampers or restrictors. A controller of well-known design is used to control fan 18 based on operating parameters, as discussed in more detail below.

Figure 3:
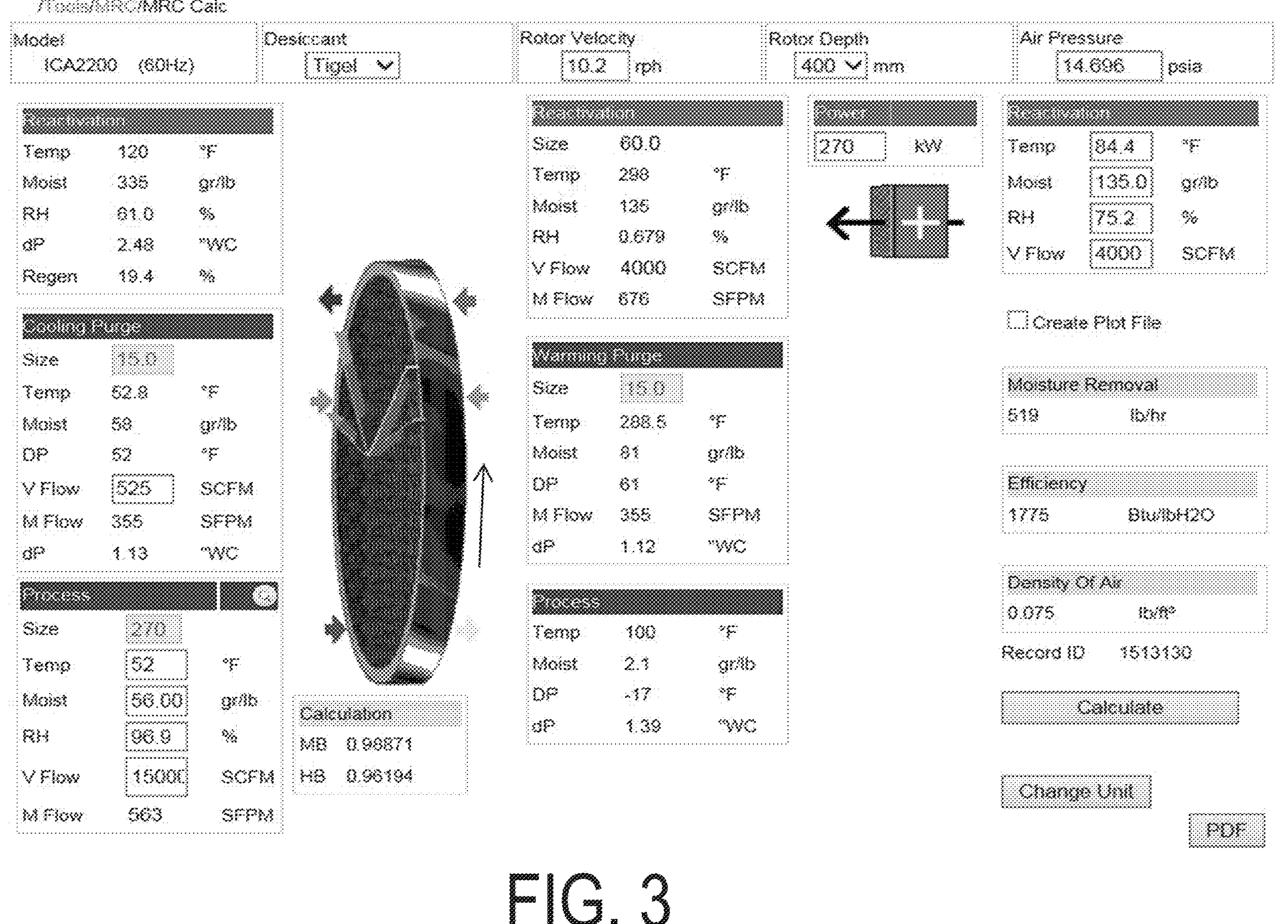
FIG. 3 shows operation data at various locations in the preferred embodiment of the rotary bed sorption system when the dry bulb temperature is higher than the dewpoint.
Figure 4:
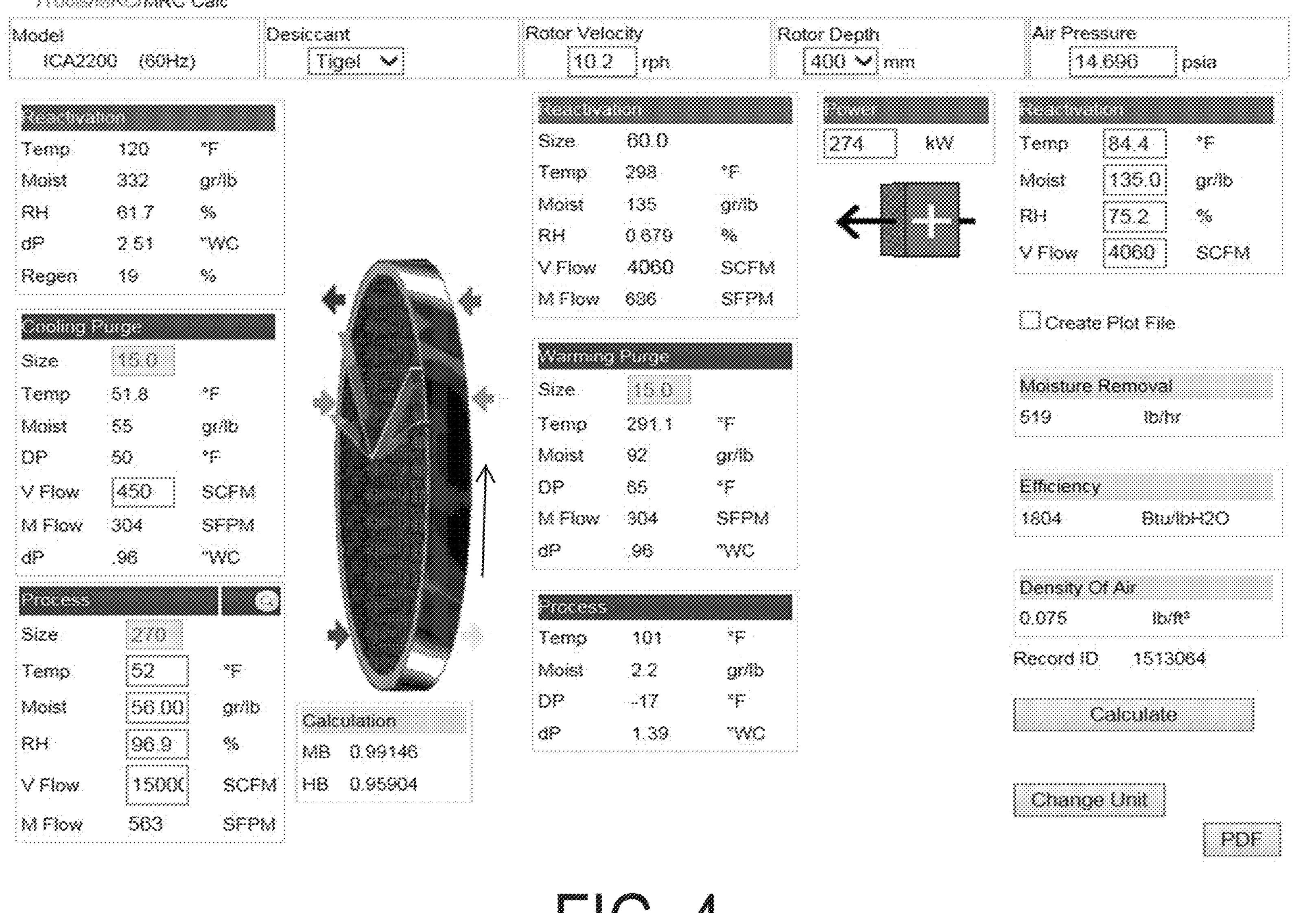
FIG. 4 shows operation data at various locations in the preferred embodiment of the rotary bed sorption system also when the dry bulb temperature is higher than the dewpoint.
Figure 5:
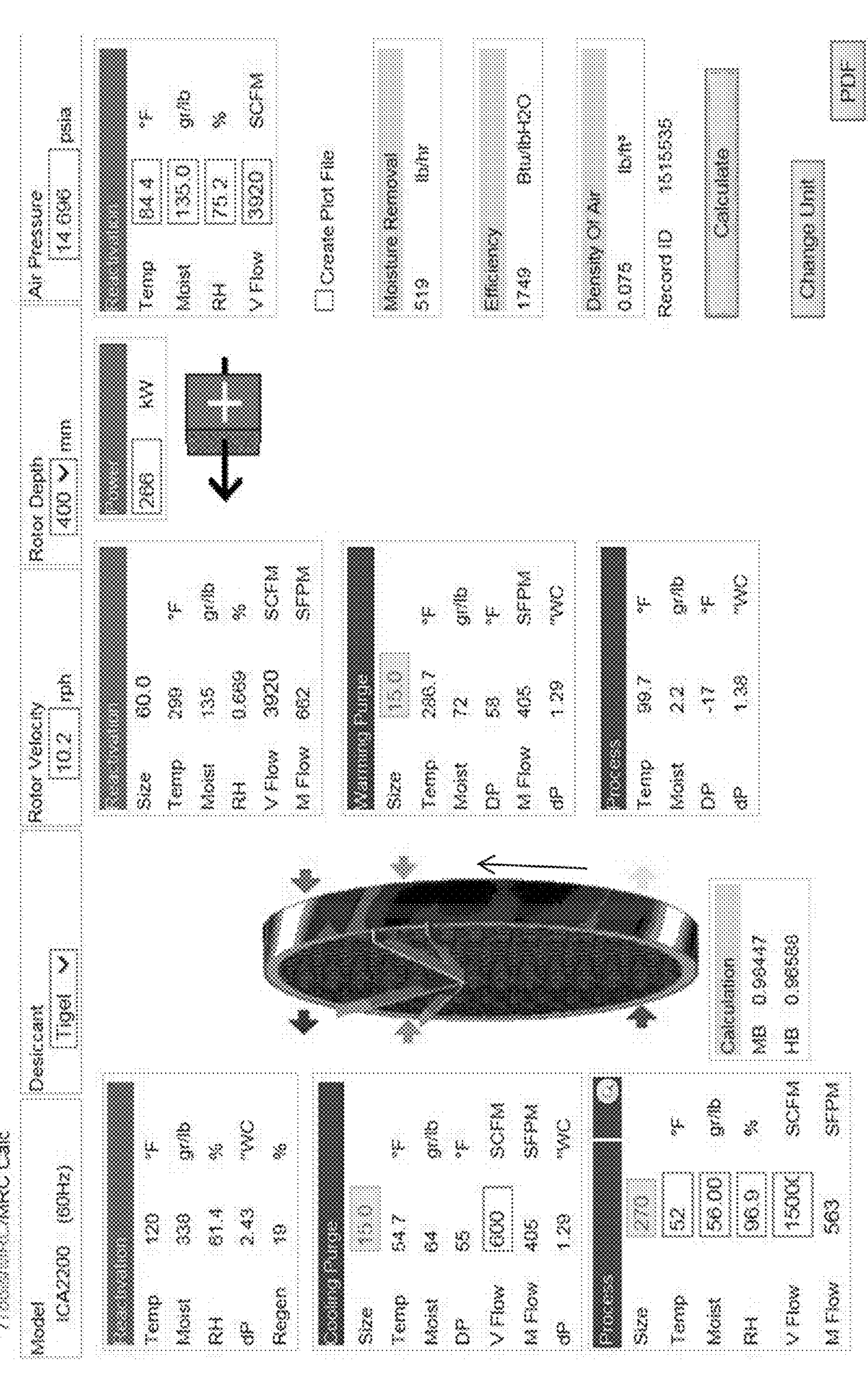
FIG. 5 shows operation data at various locations in the preferred embodiment of the rotary bed sorption system when the dry bulb temperature is lower than the dewpoint.

The purge loop recovers waste heat from the process zone of the rotor and uses it to preheat the rotor before the regeneration zone, while also cooling the rotor before the process zone. As noted above, under certain conditions, the moisture content in the purge flow can condense, which can lead to system damage and maintenance issues as well as limit the type of desiccant that can be used in a particular system. More specifically, if the dry bulb temperature in a recycled airstream drops below the dewpoint temperature, condensation may form. Slowing down the volume of the air stream can eliminate these conditions. In a preferred embodiment, the system uses variable speed fan 18 as well as temperature and humidity sensors 20 to vary the airflow in the recycled purge sectors to maintain the dry bulb temperature at a higher value than the dewpoint temperature in the airstream. Controller 22 monitors data from sensors 20, calculates or looks up the dewpoint and dry bulb temperatures of the air, and adjusts the airflow of the loop by varying the speed of the fan 18. As a non-limiting example, consider a rotary bed sorption system in which the purge volume is set at 525 SCFM. Under the conditions shown in FIG. 3, in the cooling purge (i.e., the airstream that has passed through cooling purge zone 4 immediately after the regeneration zone 3), the dry bulb temperature is 52.8° F. with a dewpoint of 52° F., and the moisture in the purge air will not condensate. In the same system, but with the purge volume set at 450 SCFM, and under the conditions shown in FIG. 4 in which the dry bulb temperature is 51.8° F. with a dewpoint of 50° F., the moisture in the purge air also will not condensate. On the other hand, with a purge volume for the same system set at 600 SCFM and under the conditions shown in FIG. 5 in which the dry bulb temperature is 54.7° F. with a dewpoint of 55° F., the moisture in the purge air will condensate.

The chart of FIG. 6 shows the yearly bin data for a specific location. Using the 600 SCFM purge volume provides added benefit under some conditions, but may lead to unwanted condensation in others. That is, a 600 SCFM purge flow allows the system to operate more efficiently, but risks condensation. The present invention addresses this condensation concern by lowering the airflow when conditions exist for condensation to occur and allowing the airflow to increase when conditions allow for higher airflow. The decrease in airflow removes the potential for condensation in the air stream. This allows the operator to change other operational parameters without having to manually change the purge flow. The system automatically adjusts the operation of the purge flow based on the actual duty point at which the system is operating. The setpoint for the dry bulb temperature to dewpoint temperature differential can be selectively varied. In this example, the differential is set at 1.5° F. This means that the purge airflow will be varied to maintain the dry bulb temperature 1.5° F. higher than the measured dewpoint temperature.

Figure 7:
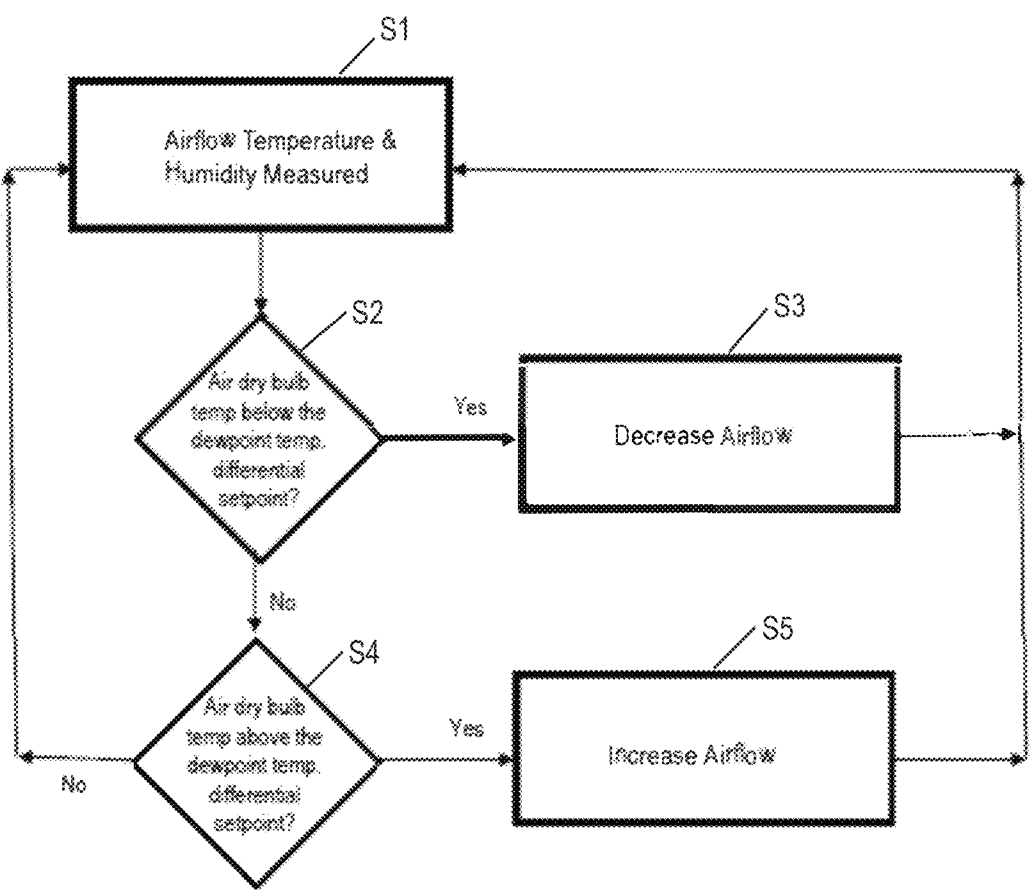
FIG. 7 is a flow chart showing a process according to a preferred embodiment of the present invention.

A sample operation will be described with reference to the flow chart of FIG. 7. Initially, the system is started at input parameters and the process fan 13, the regeneration fan 16, and the purge recirculation fan 18 are operated at their initial setpoints, the rotor is driven at its set speed, and the regeneration heater 15 is activated. After startup, at step S1, the airflow temperature and humidity at the cooling side of the purge loop are measured with sensors 20, and the controller 22 calculates the dry bulb temperature and dewpoint temperature of the cooling purge flow. At step S2, the controller 22 determines whether the cooling purge air dry bulb temperature is lower than the dewpoint temperature by a difference of at least the differential setpoint (in this example, 1.5° F.). If Yes, because condensation may occur, the process proceeds to step S3 and the speed of the purge recirculation fan is reduced by a set amount to reduce the speed of the purge airflow. This will cause the dry bulb temperature to increase and/or the dewpoint temperature to decrease. If No after step S2, the process proceeds to step S4, at which the controller 22 determines whether the cooling purge air dry bulb temperature is higher than the dewpoint temperature by a difference of at least the differential setpoint. If Yes, in order to increase the purge airflow to increase the efficiency of the system, the process proceeds to step S5 and the speed of the purge recirculation fan is increased by a set amount to increase the speed of the purge airflow. This will cause the dry bulb temperature to decrease and/or the dewpoint temperature to increase. If No after step S4 (or after step S3), the process returns to step S1, at which the controller 22 once again calculates the dry bulb temperature and dewpoint temperature of the cooling purge flow based on most recent readings from sensors 20 and continuously repeats the process. Accordingly, the controller 22 ensures that the absolute value of the difference between the dry bulb temperature and dewpoint temperature of the cooling purge flow is no greater than the setpoint differential so as to ensure condensation will not occur in the purge airflow and the system will run at maximum allowable efficiency.

In the foregoing example, the conditions were monitored and the airflow controlled in the purge loop. However, the present invention can also be applied to other recycling airflow loops in bed sorption systems. For example, in U.S. Pat. No. 7,101,414 and U.S. Patent Application Publication No. 2020/0001226, the monitoring and control can be effected in one or more of the isolation loops, purge loops, and purge/regeneration loops.

In the foregoing example, the airflow was controlled in the recycling loops by controlling the speed of the recirculating fan. However, the present invention can also use other means to modulate the airflow, such as controllable baffles, dampers, or restrictors.

In the preferred embodiments described above, those of ordinary skill in the art will recognize that the selection of specific flow rates, pressures, temperatures, relative humidities, etc., depends on the particular application for the sorption system, and will be able to make appropriate selections for a given application.

The embodiments discussed above are representative of preferred embodiments of the present invention and are provided for illustrative purposes only. They are not intended to limit the scope of the invention. Although specific configurations, structures, conditions, etc., have been shown and described, such are not limiting. Modifications and variations are contemplated within the scope of the present invention, which is intended to be limited only by the scope of the accompanying claims.

What is claimed is:

1. A method of reducing the sorbate concentration of a process fluid stream using a sorption bed system comprising a rotating mass of a regenerable sorbent material, the method comprising the steps of:

rotating the sorbent mass so that, in a cycle of operation, a given volume of the sorbent mass sequentially passes through at least first, second, third, and fourth zones, before returning to the first zone;

passing a process fluid stream through the sorbent mass in the first zone;

passing a regeneration fluid stream through the sorbent mass in the third zone;

recycling a recycled fluid stream in a closed loop, independent of the process fluid stream and the regeneration fluid stream, between the sorbent mass in the fourth zone and in the second zone;

monitoring at least two parameters in the recycled fluid stream, the at least two parameters including the dry bulb temperature and the dew point of the recycled fluid stream; and controlling the recycled fluid stream based on the at least two parameters, wherein the controlling step controls a flow rate of the recycled fluid stream based on a comparison of the dry bulb temperature and the dewpoint of the recycled fluid stream.

2. The method of claim 1, wherein if the dry bulb temperature in the recycled fluid stream is lower than the dewpoint, the flow rate of the recycled fluid stream is decreased.

3. The method of claim 1, wherein if the dry bulb temperature in the recycled fluid stream is higher than the dewpoint, the flow rate of the recycled fluid stream is increased.

4. The method of claim 1, further comprising the step of recirculating the process fluid stream in a substantially closed loop to dehydrate or maintain dryness of a product.

5. The method of claim 1, wherein the recycled fluid stream is a purge fluid stream.

6. The method of claim 1, wherein the recycled fluid stream is an isolation fluid stream.

7. A rotary sorption bed system, comprising:

a rotating sorbent mass of a regenerable sorbent material, in a cycle of operation, a given volume of the sorbent mass sequentially passing through at least first, second, third, and fourth zones, before returning to the first zone;

a process fluid stream directed through the first zone;

a regeneration fluid stream directed through the third zone;

a recycled fluid stream that recirculates in a closed loop independent of the process fluid stream and the regeneration fluid stream through the second and fourth zones;

a sensor configured to measure at least two parameters in the recycled fluid stream, the at least two parameters including the dry bulb temperature and the dew point of the recycled fluid stream; and a controller configured to control the recycled fluid stream based on the measured at least two parameters, wherein the controller controls a flow rate of the recycled fluid stream based on a comparison of the dry bulb temperature and the dewpoint of the recycled fluid stream.

8. The system of claim 7, wherein if the dry bulb temperature in the recycled fluid stream is lower than the dewpoint, the flow rate of the recycled fluid stream is decreased.

9. The system of claim 7, wherein if the dry bulb temperature in the recycled fluid stream is higher than the dewpoint, the flow rate of the recycled fluid stream is increased.

10. The system of claim 7, wherein the controller controls recirculation of the process fluid stream in a substantially closed loop to dehydrate or maintain dryness of a product.

11. The system of claim 7, wherein the recycled fluid stream is a purge fluid stream.

12. The system of claim 7, wherein the recycled fluid stream is an isolation fluid stream.

13. A method of reducing the sorbate concentration of a process fluid stream using a sorption bed system comprising a rotating mass of a regenerable sorbent material, the method comprising the steps of:

rotating the sorbent mass so that, in a cycle of operation, a given volume of the sorbent mass sequentially passes through a process zone, a regeneration zone, and a third zone disposed between the process zone and the regeneration zone, before returning to the process zone;

passing a first fluid stream through the sorbent mass in the process zone;

passing a second fluid stream through the sorbent mass in the third zone and then through the sorbent mass in the regeneration zone;

monitoring at least two parameters in the second fluid stream, the at least two parameters including the dry bulb temperature and the dew point of the second fluid stream; and controlling the second fluid stream based on the at least two parameters, wherein the controlling step controls a flow rate of the second fluid stream based on a comparison of the dry bulb temperature and the dewpoint of the second fluid stream.

14. A rotary sorption bed system, comprising:

a rotating sorbent mass of a regenerable sorbent material, in a cycle of operation, a given volume of the sorbent mass sequentially passing through a process zone, a regeneration zone, and a third zone disposed between the process zone and the regeneration zone, before returning to the process zone;

a first fluid stream directed through the process zone;

a second fluid stream directed through the third zone and then through the regeneration zone;

a sensor configured to measure at least two parameters in the second fluid stream, the at least two parameters including the dry bulb temperature and the dew point of the second fluid stream; and a controller configured to control the second fluid stream based on the measured at least two parameters, wherein the controller controls a flow rate of the second fluid stream based on a comparison of the dry bulb temperature and the dewpoint of the second fluid stream.

* * * * *